(12) United States Patent
LeBlanc, Sr. et al.

(10) Patent No.: US 7,797,786 B2
(45) Date of Patent: Sep. 21, 2010

(54) WIPER SYSTEM FOR VISION BLOCK ARRAY IN VEHICLES

(75) Inventors: James C. LeBlanc, Sr., Rochester, MI (US); James C. LeBlanc, Jr., Washington, MI (US); Adam L. Hiltunen, Chesterfield, MI (US); William A. Meyer, Sterling Heights, MI (US)

(73) Assignee: GPV, L.L.C., Southfield, MI (US)

( * ) Notice: Subject to any disclaimer, the term of this patent is extended or adjusted under 35 U.S.C. 154(b) by 1195 days.

(21) Appl. No.: 11/403,937

(22) Filed: Apr. 14, 2006

(65) Prior Publication Data
US 2007/0240272 A1 Oct. 18, 2007

(51) Int. Cl.
*B60S 1/16* (2006.01)
*B60S 1/06* (2006.01)
(52) U.S. Cl. ............. 15/250.29; 15/250.31; 15/250.001
(58) Field of Classification Search ............... 15/250.29, 15/250.001, 250.002, 250.003, 250.24, 250.31
See application file for complete search history.

(56) References Cited

U.S. PATENT DOCUMENTS

| | | | | | |
|---|---|---|---|---|---|
| 1,405,773 | A | * | 2/1922 | Folberth | 15/250.29 |
| 1,886,812 | A | * | 11/1932 | Hueber et al. | 15/250.29 |
| 3,609,794 | A | * | 10/1971 | Schallehn | 15/250.24 |
| 4,058,256 | A | * | 11/1977 | Hobson et al. | 239/101 |
| 4,162,555 | A | * | 7/1979 | Jackson | 15/250.1 |
| 4,174,653 | A | * | 11/1979 | Appelblatt | 89/36.08 |
| 5,046,216 | A | * | 9/1991 | Baungarter et al. | 15/250.29 |
| 6,453,504 | B1 | * | 9/2002 | Burkard et al. | 15/250.003 |
| 2003/0000040 | A1 | * | 1/2003 | Trajkovic et al. | 15/250.29 |

FOREIGN PATENT DOCUMENTS

| | | | |
|---|---|---|---|
| JP | 63-112247 | * | 5/1988 |
| JP | 2005-271916 | * | 10/2005 |

OTHER PUBLICATIONS

Abstract of Japanese publication 63-112247 published May 1988.*
Abstract of Japanse publication 2005-271916 published Oct. 2005.*

* cited by examiner

*Primary Examiner*—Gary K Graham
(74) *Attorney, Agent, or Firm*—Novak Druce + Quigg LLP

(57) ABSTRACT

A wiper assembly for a vehicle having at least one vision block within an outer face, generally consisting of a guide cylinder supportable on the vehicle, disposed adjacent and substantially parallel to the face of the vision block; a piston disposed in the guide cylinder and displaceable along the length thereof, provided with a magnetic element; a follower mounted on the guide cylinder, displaceable along the length thereof, provided with a magnetic element magnetically coupled to the magnetic element of the piston for displacement therewith; a wiper carried by the follower, having a portion engaging the outer face of the vision block in wiping relation therewith; and means operatively connectable to a source of fluid under pressure for alternately supplying fluid under pressure to opposite ends of the guide cylinder for reciprocating the piston and correspondingly the wiper along the outer face of the vision block.

11 Claims, 3 Drawing Sheets

WIPER SYSTEM FOR VISION BLOCK ARRAY IN VEHICLES

This invention relates to a wiper system and more particularly to a novel wiper system for a vision block array installed in a vehicle. The invention further contemplates a window assembly for vehicles equipped with such a wiper system.

BACKGROUND OF THE INVENTION

In certain vehicles including military and paramilitary vehicles, there commonly is provided an array of window units often arranged in a U-shaped configuration. As in all vehicles, such units need to be provided with wiper means to permit clear visibility of the vehicle exterior during operation of such vehicles under inclement weather conditions. It particularly is important that such units be provided with a simple, reliable and effective system for maintaining such units clear to provide unobstructed visibility of the operator of such vehicles. Accordingly, it is the principal object of the present invention to provide a simple, reliable and effective system for wiping an array of window units of a vehicle to provide the operator thereof clear visibility under inclement weather conditions.

SUMMARY OF THE INVENTION

The principal object of the present invention is achieved by providing a wiper system for a vehicle having at least one vision block with an outer face, generally consisting of a guide cylinder supportable on the vehicle, disposed adjacent and substantially parallel to the face of the vision block; a piston disposed in the guide cylinder and displaceable along the length thereof, having a magnetically attractive component; a follower mounted on the guide cylinder, displaceable along the length thereof, having a magnet coupled to the magnetically attractive component of the piston for displacement therewith; a wiper carried by the follower, having a portion engaging the outer face of the vision block in wiping relation therewith; and means operatively connectable to a source of fluid under pressure on the vehicle for alternatively supplying fluid under pressure to opposite ends of the guide cylinder for reciprocating the piston and correspondingly the follower and attached wiper along the outer face of the vision block. The source of fluid for reciprocating the piston of the guide cylinder may be pneumatic or hydraulic. A simple control valve may be utilized for directing the fluid under pressure to opposite ends of the guide cylinder. The array of vision blocks may be of any desired configuration but a U-shaped configuration is preferred to provide a panoramic view for the operator of the vehicle. The mechanism for providing the reciprocating motion may be provided with a single wiper element for wiping the outer surface of a single vision block or may be provided with multiple wiper elements for wiping the outer surfaces of two or more vision blocks. In addition, the reciprocating elements may be configured to guide wiper elements of multiple vision blocks either aligned in end-to-end relation or angularly disposed relative to each other.

DETAILED DESCRIPTION OF THE PREFERRED EMBODIMENT OF THE INVENTION

Figure 1A:
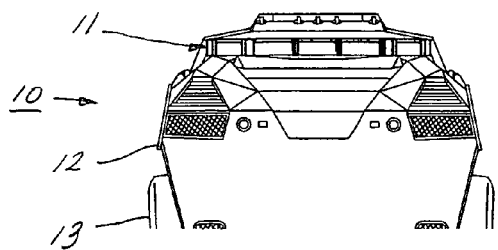
FIG. 1A is a front elevational view of a vehicle equipped with an array of vision blocks provided with a wiping system for such array, embodying the present invention, in which portions of the vehicle are taken away.
Figure 1B:
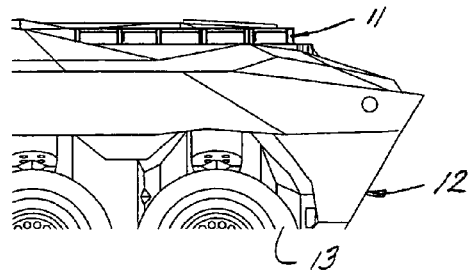
FIG. 1B is a side elevational view of the vehicle shown in FIG. 1A, having portions thereof taken away.

Referring to FIGS. 1A and 1B of the drawings, there is illustrated a vehicle 10 provided with a vision block array 11 embodying the present invention. The vehicle is of a military or paramilitary type including a body 12 of a monocoque construction supported on a set of wheel units 13, on which the vision block array is mounted to provide the operator thereof with a panoramic view of the exterior, a power plant mounted within the body, a drive line operatively connecting the power plant and the wheel units and a steering system operatively connected to the wheel units.

Figure 2:
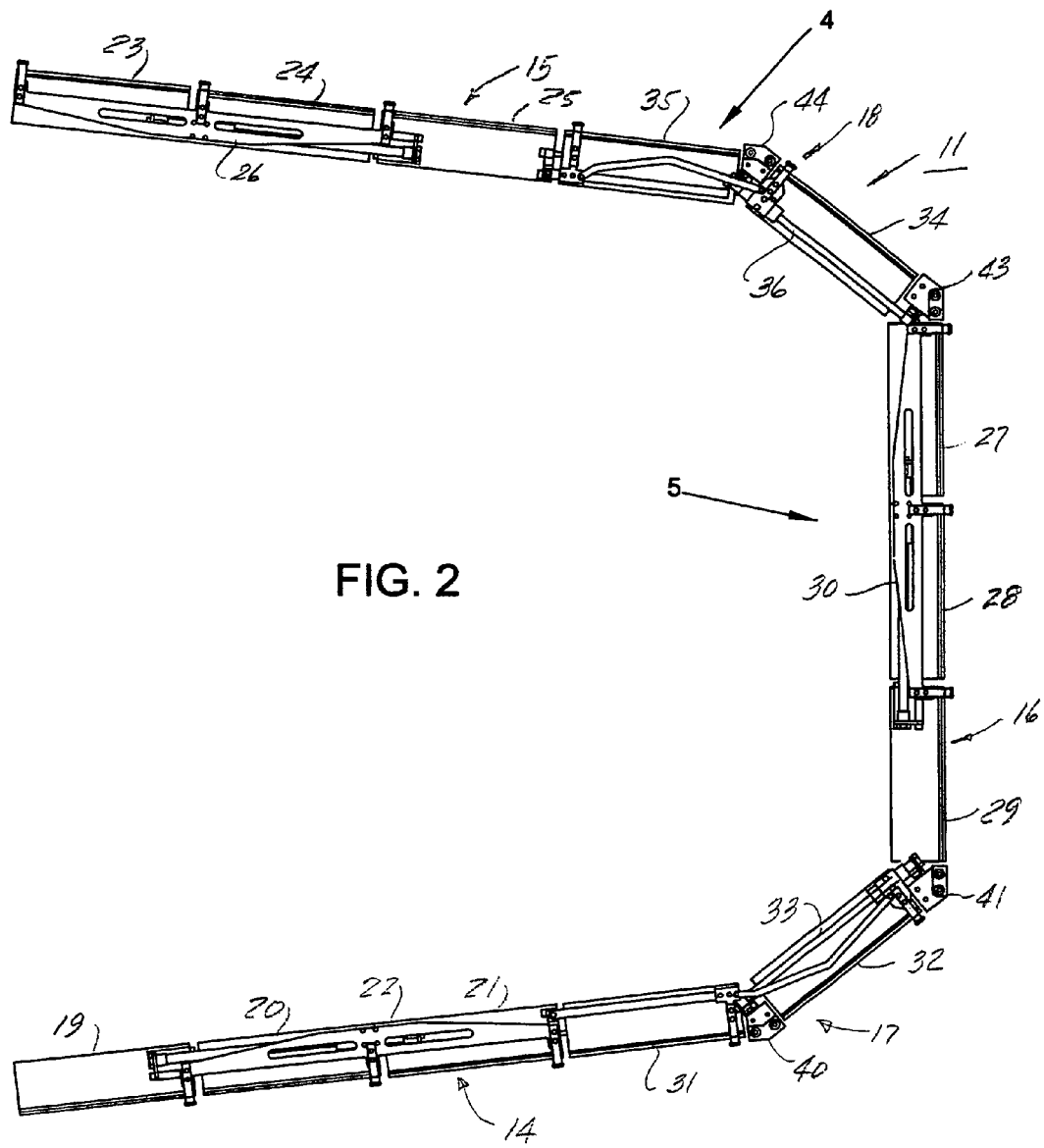
FIG. 2 is an enlarged, top plan view of the vision block array shown in FIGS. 1A and 1B provided with a wiper system embodying the present invention.
Figure 4:
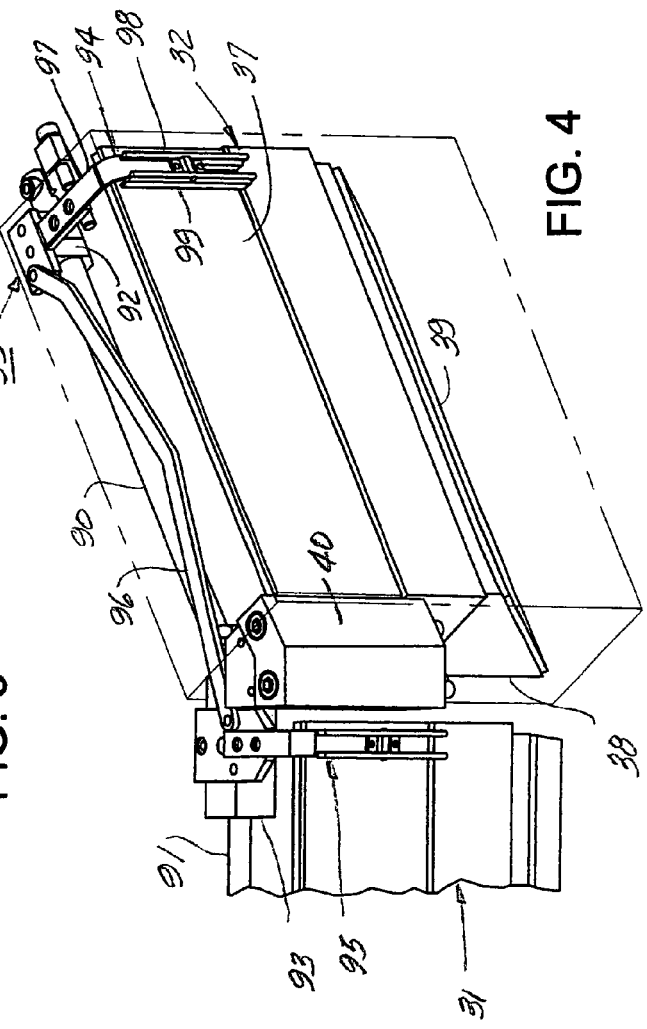
FIG. 4 is an enlarged, perspective view of a portion of the vision block array shown in FIG. 2, designated by the numeral 4, having portions thereof broken away.
Figure 5:
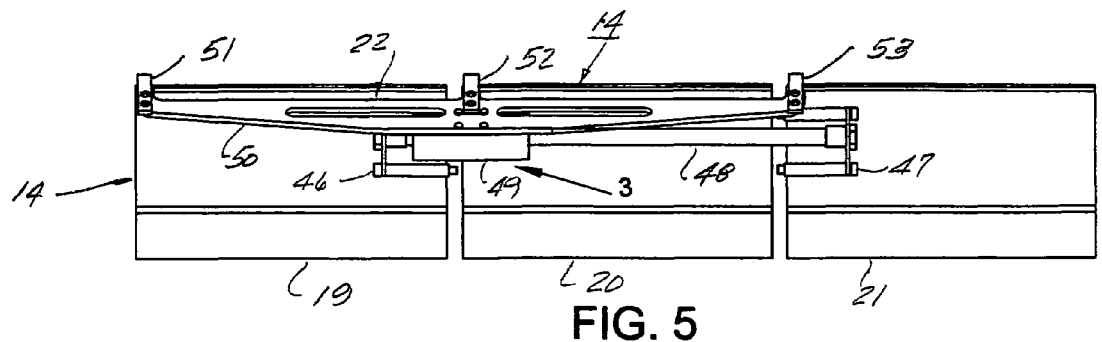
FIG. 5 is an enlarged, top plan view of a section of the vision block arrangement shown in FIG. 2, illustrating the reciprocal wiper mechanism in a position furthest to the left.
Figure 6:
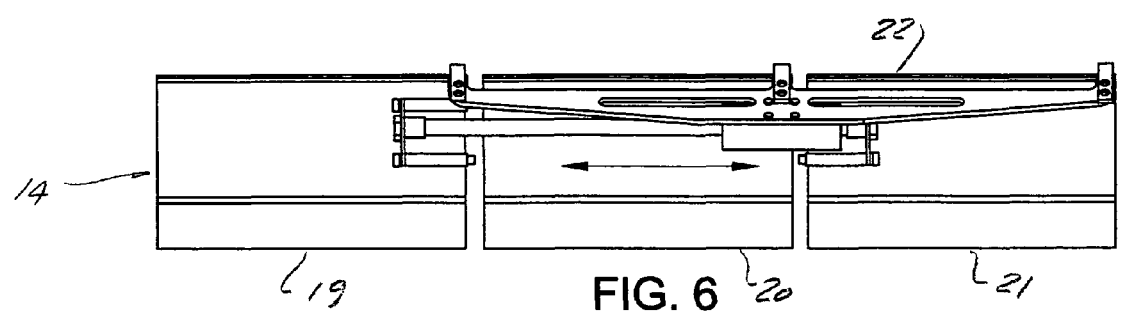
FIG. 6 is a view similar to the view shown in FIG. 5, illustrating the reciprocal wiper mechanism in a position furthest to the right.
Figure 7:
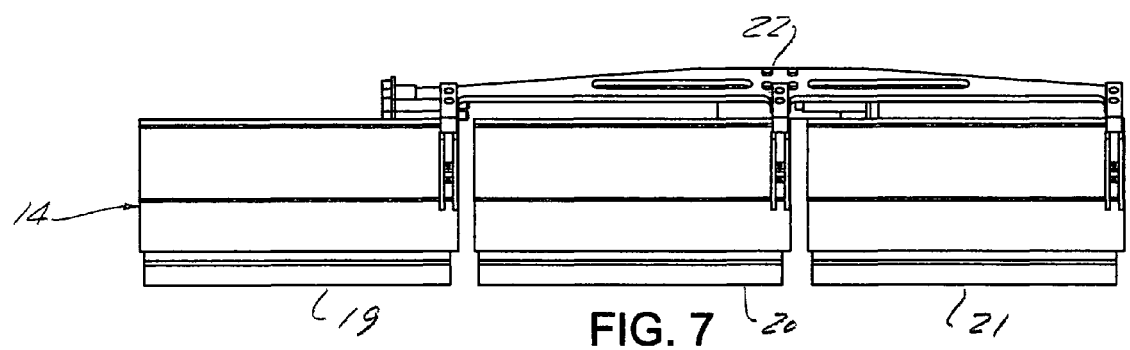
FIG. 7 is a front elevational view of the assembly shown in FIG. 5.
Figure 8:
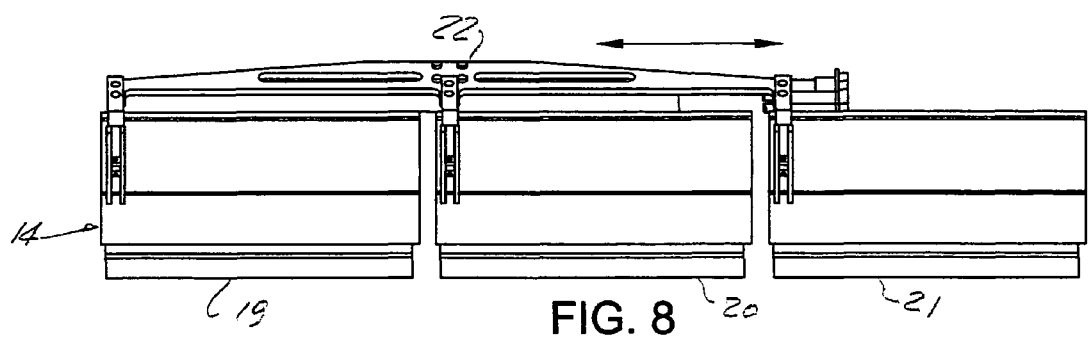
FIG. 8 is a front elevational view of the assembly shown in FIG. 6.

As best shown in FIG. 2, vision block array 12 has a substantially U-shaped configuration including first and second side sections 14 and 15 spaced apart and converging slightly, a third front section 16 having the end portions thereof spaced from the forward end portions of first and second side sections 14 and 15 and a pair of fourth and fifth corner sections 17 and 18 disposed between the ends of first side section 14 and third front section 16 and the ends of second side section 15 and third front section 16, respectively. Sections 14, 15 and 16 are substantially identical in construction and operation, and sections 17 and 18 are substantially similar in construction and operation. Array section 14 consists of a set of vision blocks 19, 20 and 21 disposed in end-to-end alignment and supported on the body of the vehicle, and a wiper mechanism 22 similarly, array section 15 includes vision blocks 23, 24 and 25 disposed in end-to-end alignment and a wiper mechanism 26, and array section 16 includes vision blocks 27, 28 and 29 disposed in end-to-end alignment and a wiper mechanism 30. Array section 17 consists of a pair of vision blocks 31 and 32 disposed in end-to-end relation, at an obtuse angle relative to each other, and a wiper mechanism 33. Similarly, array section 11 includes a pair of vision blocks 34 and 35 disposed in end-to-end relation, at an obtuse angle relative to each other, and a wiper mechanism 36. Each of the vision blocks are the same configuration. As best shown in FIG. 4, vision block 32 includes a front, exterior face 37, a rear interior face 38 disposed substantially parallel to front, exterior face 37, a bottom surface 39 disposed at an angle relative to the front and rear faces, and an upper surface (not shown) disposed at an angle to the front and rear faces, parallel to bottom surface 39. Light images entering outer face 37 are bent 90° by each of the upper and lower inclined surfaces of the vision block to allow the operator within the vehicle to view the exterior, seated within the vehicle with his eye level at the level of the lower end of interior face 38 of the block. Spacer blocks 40 and 41 are provided between ends of vision blocks 31 and 32 and vision blocks 32 and 29, respectively, and spacer blocks 43 and 44 similarly are provided between the ends of vision blocks 27 and 34 and vision blocks 34 and 35, respectively.

Referring to FIGS. 5 through 8, wiper mechanism 22 includes a pair of support brackets 46 and 47 mounted on the vehicle body and having leg portions extending up between successive vision blocks, a cylindrical guide member 48 disposed parallel and adjacent the exterior faces of the vision blocks and supported at its ends on support brackets 46 and 47, a carrier 49 mounted on and displaceable along the length of guide member 48, a carrier 50 mounted on and displaceable with a follower 49 and a set of wiper members 51, 52 and 53 which cooperate with the front exterior faces of the vision blocks in wiping relationship therewith.

Figure 3:
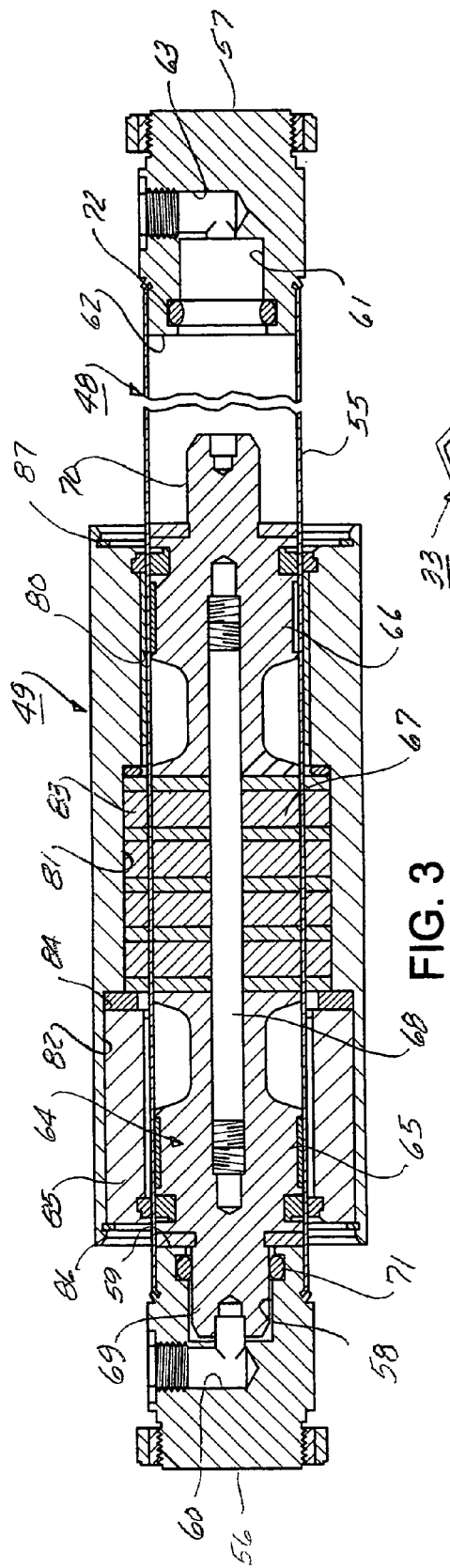
FIG. 3 is an enlarged, vertical cross-sectional view of a mechanism utilized in the wiper system shown in FIG. 3 for reciprocating the wiper elements thereof.

The details of cylindrical guide member 48 and follower 49 are best illustrated in FIG. 3. The guide member includes a cylindrical member 55 formed of a nonmagnetizable material, closed at its ends with a pair of end caps 56 and 57. End cap 56 is provided with a recess 58 in an inner face 59 thereof which communicates at its base end with a port through a passageway 60. Similarly, end cap 58 is provided with a recess 61 in an inner face 62 thereof which communicates with a port through a passageway 63. Disposed within cylindrical member 55 between the end caps thereof is a piston 64 which is displaceable axially within cylindrical member 55. The piston includes a pair of end sections 65 and 66 and a magnetic element 67 interposed between piston sections 65 and 66 and secured therebetween by means of an axially disposed rod 68 having threaded end portions threaded into threaded openings in the inner faces of piston sections 65 and 66. Piston section 65 is provided with a protruding end portion 69 which is received in recess 58 of end cap 56 when piston 64 is in its furthest left hand position as shown in FIG. 3, and piston section 66 similarly is provided with a protruding end portion 70 which is received in recess 61 of end cap 57 when piston 64 is in its furthest right hand position. Recesses 58 and 61 further are provided with O-rings 71 and 72, respectively, to provide seals between the protruding portions of the piston sections and the end caps when such protruding portions are received within the recesses in the end caps. Passageways 60 and 63 are adapted to be connected to a source of fluid under pressure on the vehicle, provided with suitable controls for supplying fluid under pressure to passageways 60 and 63 and correspondingly to opposite ends of cylinder 55 to reciprocate piston 64 in guide member 48. The fluid may be either pneumatic or hydraulic.

Follower 49 is provided with a cylindrical opening 80 therethrough, through which cylindrical member 55 of the guide member is received. Such opening is provided with a first enlargement 81 disposed in the center of the follower and a second enlargement 82 at an end of the follower. Disposed within enlarged section 81 is an annular magnetic element 83 which is magnetically coupled to magnetic element 67 of piston 64, and is maintained in a centered position by means of a retainer ring 84 disposed in enlarged section 82. An annular spacer 85 is disposed in enlarged section 82 and such components are retained in assembled condition by means of a pair of retainers 86 and 87.

Carrier 50 is an elongated member disposed substantially parallel to guide member 48 and secured at the center thereof to the upper portion of follower 49. Wiper members 51 and 53 are secured to the ends of the carrier and wiper member 52 is mounted on the center thereof. The positioning of the guide member 48 relative to vision locks 19, 20 and 21, carrier 50 on guide member 48 and the spacing of wiper members 51, 52 and 53 on the carrier member are such so that when follower 49 is displaced along the length of guide member 48, wiper elements of wiper members 51, 52 and 53 will traverse the front, exterior faces of vision blocks 19, 20 and 21 in wiping relation. Each of wiper members 51, 52 and 53 have an L-shaped configuration with one portion thereof secured to carrier member 50 and a second portion thereof lying adjacent the front, exterior face of a vision block with a wiper element in engagement with such front, exterior face of the vision block. Each of such wiper members is as shown in FIG. 4.

Wiper mechanisms 26 and 27 are similar to wiper mechanism 22 in construction and operation. When fluid under pressure is supplied to opposite ends of the guide member in wiper mechanism 22 to reciprocate the piston thereof magnetically coupled with the follower thereof, the carrier member thereof will reciprocate to cause the wiper elements to wipe the front, exterior faces of vision blocks 19, 20 and 21. Similarly, when fluid under pressure is alternately supplied to the ends of the guide member of wiper mechanism 26 to reciprocate the piston thereof magnetically coupled with the follower thereof, the carrier member thereof will reciprocate to cause the wiper elements to wipe the front, exterior faces of vision blocks 23, 24 and 25. In the same manner, when fluid under pressure is supplied to the opposite ends of the guide member of wiper mechanism 30 to reciprocate the piston thereof magnetically coupled to the follower thereof, the carrier member thereof will correspondingly reciprocate to move the wiper members across the front, exterior surfaces of vision blocks 27, 28 and 29.

Wiper mechanisms 33 and 36 are constructed differently but operate similarly to previously described wiper mechanisms 22, 26 and 30. As best shown in FIG. 4, wiper mechanism 33 includes a first cylindrical guide member 90, a second cylindrical guide member 91, a first follower 92 mounted on and displaceable along guide member 90, a second follower 93 mounted on a displaceable along guide member 91 and a pair of wiper members 94 and 95. Guide member 90 is supported on brackets mounted on the body of the vehicle and is disposed above and parallel to front, exterior face 37 of vision block 32. Similarly, guide member 91 is supported on brackets mounted on the body of the vehicle and is disposed above and parallel to the front, exterior face of vision block 31. Guide member 90 is similar to previously described guide member 48 and includes a piston similar to previously described piston 64. Follower 92 is similar to previously described follower 49 and includes a magnetic element magnetically coupled to the magnetic element provided in the piston in guide member 90 so that upon supplying fluid under pressure to opposite ends of guide member 90, follower 92 will reciprocate along the length of guide member 90. Guide member 91 is simply a cylindrical member comparable to cylindrical member 55 without any piston provided therein. Follower 93 is simply a block reciprocal on guide member 91 without any magnetic element in magnetic coupling relationship with any piston in cylinder member 91. The reciprocating motion of follower 92 relative to guide member 90 is transmitted to follower 93 by means of an interconnecting motion transmitting arm 96. Wiper member 94 has an L-shaped configuration including an upper portion 97 secured to follower 92 and a depending portion 98 having a wiper element 99 disposed in wiping relation with outer, exterior face 37 of vision block 32, as follower 92 is reciprocated along guide member 90. The reciprocating motion of follower 92 is transmitted to follower 93 by means of motion transmitting arm 96 so that follower 93 will similarly be reciprocated along guide member 91 to correspondingly cause the wiper element of wiper member 95 to reciprocate along the front, exterior face of vision block 31. Wiper mechanism 36 is similar in construction and operation to wiper mechanism 33 for wiping the front, exterior faces of vision blocks 34 and 35.

The opposite ends of the guide members of wiper mechanisms 33 and 36 provided with reciprocating pistons magnetically coupled to followers, similarly are connected to a source of fluid under pressure on the vehicle, provided with suitable controls to alternately supply fluid under pressure to the opposite ends of the operable guide members to correspondingly reciprocate the wiper members thereof. Such source of fluid under pressure also may be pneumatic or hydraulic.

The number of vision blocks as described and the wiper mechanisms therefor may be varied in number and configurations to provide different vision block arrays as desired. Such system provides not only a commonality of components minimizing production costs but a simple arrangement which may be easily assembled and economically operated and maintained. A system consisting of such an array of vision blocks and wiper mechanisms is also reliable in performance requiring simply a source of fluid under pressure and appropriate controls for supplying fluid under pressure alternatively to the opposite ends of the operating guide members of the wiper mechanisms. No electrical failures of any system will disable the wiper mechanisms and thus preclude visibility to the vehicle operators except for the failure of electrical systems operating any pneumatic or hydraulic systems. Each of such wiper mechanisms may be easily assembled during initial production and easily disassembled, repaired, maintained and reassembled.

A particularly advantageous feature of the invention is that whenever any of the wiper elements become immobilized due to the formation of ice, snow, sand, mud or other substances on the exteriors of the vision blocks, the assemblies will continue to operate without causing breakage of the wiper elements. Under such conditions, the pistons carrying the magnetic elements will continue to reciprocate, magnetically coupling and uncoupling with the carriers, applying and removing a force on the carrier until it is freed. Under such circumstances, damage to the wiper mechanism is avoided.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

We claim:

1. A wiper assembly for a vehicle having at least one vision block with an outer face, comprising:
    a guide cylinder supportable on said vehicle, disposed atop said vision block and substantially parallel to said face of said vision block;
    a piston disposed in said guide cylinder and displaceable along the length thereof, provided with a magnetic element;
    a follower mounted on said guide cylinder, displaceable along the length thereof, provided with a magnetic element magnetically coupled to the magnetic element of said piston for displacement therewith;
    a wiper carried by said follower, having a forwardly projecting portion and a depending portion engaging said outer face of said vision block in wiping relation therewith;
    means operatively connectable to a source of fluid under pressure for alternatively supplying fluid under pressure to opposite ends of said guide cylinder for reciprocating said piston and correspondingly said wiper along said outer face of said vision block; and
    a second vision block disposed in end-to-end relationship with said one vision block wherein there is provided a second wiper carried by said follower, having a forwardly projecting portion and a depending portion engaging an outer face of said second vision block.

2. A wiper assembly for a vehicle having at least one vision block with an outer face, comprising:
    a guide cylinder supportable on said vehicle, disposed atop said vision block and substantially parallel to said face of said vision block;
    a piston disposed in said guide cylinder and displaceable along the length thereof, provided with a magnetic element;
    a follower mounted on said guide cylinder, displaceable along the length thereof, provided with a magnetic element magnetically coupled to the magnetic element of said piston for displacement therewith; and
    a wiper carried by said follower, having a forwardly projecting portion and a depending portion engaging said outer face of said vision block in wiping relation therewith; and
    means operatively connectable to a source of fluid under pressure for alternatively supplying fluid under pressure to opposite ends of said guide cylinder for reciprocating said piston and correspondingly said wiper along said outer face of said vision block; and
    second and third vision blocks disposed in end-to-end relationship with said one vision block wherein there is provided second and third wipers carried by said follower, having respective portions engaging outer faces of said second and third vision blocks.

3. A wiper assembly according to claim 2 wherein said one vision block is disposed between said second and third vision blocks.

4. A wiper assembly for a vehicle having at least one vision block with an outer face, comprising:
    a guide cylinder supportable on said vehicle, disposed atop said vision block and substantially parallel to said face of said vision block;
    a piston disposed in said guide cylinder and displaceable along the length thereof, provided with a magnetic element;
    a follower mounted on said guide cylinder, displaceable along the length thereof, provided with a magnetic element magnetically coupled to the magnetic element of said piston for displacement therewith; and
    a wiper carried by said follower, having a forwardly projecting portion and a depending portion engaging said outer face of said vision block in wiping relation therewith; and
    means operatively connectable to a source of fluid under pressure for alternatively supplying fluid under pressure to opposite ends of said guide cylinder for reciprocating said piston and correspondingly said wiper along said outer face of said vision block; and
    a second vision block disposed in end-to-end relation and at an angle to said one vision block, wherein there is provided:

a second guide member supportable on said vehicle; disposed atop said second vision block and substantially parallel to an outer face of said second vision block;

a second follower mounted on said second guide member, displaceable along the length thereof;

a wiper carried by said second follower, having a forwardly projecting portion and a depending portion engaging the outer face of said second vision block in wiping relation therewith; and means operatively interconnecting said first mentioned and second followers for transmitting motion from said first mentioned follower to said second follower.

5. A wiper assembly for a vehicle having a first section including at least one vision block with an outer face, a second section spaced relative to said first section and including at least one vision block with an outer face, a third section spaced from ends of said first and second sections and including at least one vision block with an outer face, a fourth section disposed between ends of said first and third sections and including at least one vision block with an outer face and a fifth section disposed between ends of said second and third sections, the disposition of said sections providing a substantially U-shaped configuration, comprising:

a guide cylinder supportable on said vehicle disposed atop said one vision block of each of said sections and substantially parallel to said one of said faces of said vision blocks of each of said sections;

a piston disposed in each guide cylinder and displaceable along the length thereof, having a magnetic element;

a follower mounted on each guide cylinder, displaceable along the length thereof, provided with a magnetic element magnetically coupled to the magnetic element of said piston for displacement therewith;

a wiper carried by each follower, having a forwardly projecting portion and a depending portion engaging said outer face of said one vision block in wiping relation therewith; and means operatively connectable to a source of fluid under pressure for alternately supplying fluid under pressure to opposite ends of said guide cylinder for reciprocating said piston and correspondingly said wiper along said outer face of said vision block; and wherein each of said first, second and third sections includes a second vision block disposed in end-to-end relationship with said one vision block thereof, and there is provided a second wiper carried by said follower having a forwardly projecting portion and a depending portion engaging an outer face of said second vision block.

6. A wiper assembly for a vehicle having a first section including at least one vision block with an outer face, a second section spaced relative to said first section and including at least one vision block with an outer face, a third section spaced from ends of said first and second sections and including at least one vision block with an outer face, a fourth section disposed between ends of said first and third sections and including at least one vision block with an outer face and a fifth section disposed between ends of said second and third sections, the disposition of said sections providing a substantially U-shaped configuration, comprising:

a guide cylinder supportable on said vehicle disposed atop said one vision block of each of said selection and substantially parallel to said one of said faces of said vision blocks of each of said sections;

a piston disposed in each guide cylinder and displaceable along the length thereof, having a magnetic element;

a follower mounted on each guide cylinder, displaceable along the length thereof, provided with a magnetic element magnetically coupled to the magnetic element of said piston for displacement therewith;

a wiper carried by each follower, having a forwardly projecting portion and a depending portion engaging said outer face of said one vision block in wiping relation therewith; and means operatively connectable to a source of fluid under pressure for alternately supplying fluid under pressure to opposite ends of said guide cylinder for reciprocating said piston and correspondingly said wiper along said outer face of said vision block:

wherein each of said fourth and fifth sections includes a second vision block disposed in end-to-end relationship with said one vision block thereof, and there is provided a second guide member displaceable along the length thereof, a wiper carried by said second follower, having a forwardly projecting portion and a depending portion engaging an outer face of said second vision block in wiping relation therewith and means operatively interconnecting said first mentioned and second followers for transmitting motion from said first mentioned follower to second follower.

7. A window assembly for a vehicle having a body comprising:

at least one vision block having an outer face mountable on said body;

a guide cylinder supportable on said vehicle disposed atop said one vision block and substantially parallel to said face of said vision block;

a piston disposed in said guide cylinder and displaceable along the length thereof, having a magnetic element;

a follower mounted on said guide cylinder, displaceable alone the length thereof, provided with a magnetic element magnetically coupled to the magnetic element of said piston for displacement therewith;

a wiper carried by said follower, having a forwardly projecting portion and a depending portion engaging said outer face of said vision block in wiping relationship therewith;

means disposed on said body for alternately supplying fluid under pressure to opposite ends of said guide cylinder for reciprocating said piston and correspondingly said wiper along said outer face of said vision block; and a second vision block disposed in end-to-end relationship with said one vision block wherein there is provided a second wiper carried by said follower, having a forwardly projecting portion and a depending portion engaging an outer face of said second vision block.

8. A window assembly for a vehicle having a body comprising:

at least one vision block having an outer face mountable on said body;

a guide cylinder supportable on said vehicle disposed atop said one vision block and substantially parallel to said face of said vision block;

a piston disposed in said guide cylinder and displaceable along the length thereof, having a magnetic element;

a follower mounted on said guide cylinder, displaceable along the length thereof, provided with a magnetic element magnetically coupled to the magnetic element of said piston for displacement therewith;

a wiper carried by said follower, having a forwardly projecting portion and a depending portion engaging said outer face of said vision block in wiping relationship therewith;

means disposed on said body for alternately supplying fluid under pressure to opposite ends of said guide cylinder for reciprocating said piston and correspondingly said wiper along said outer face of said vision block; and second and third vision blocks disposed in end-to-end relation with said one vision block wherein there is provided second and third wipers carried by said follower, having respective portions engaging outer faces of said second and third vision blocks.

9. A window assembly according to claim 8 wherein said one vision block is disposed between said second and third vision blocks.

10. A window assembly for a vehicle having a body comprising:

at least one vision block having an outer face mountable on said body;

a guide cylinder supportable on said vehicle disposed atop said one vision block and substantially parallel to said face of said vision block;

a piston disposed in said guide cylinder and displaceable alone the length thereof, having a magnetic element;

a follower mounted on said guide cylinder, displaceable along the length thereof, provided with a magnetic element magnetically coupled to the magnetic element of said piston for displacement therewith;

a wiper carried by said follower, having a forwardly projecting portion and a depending portion engaging said outer face of said vision block in wiping relationship therewith;

means disposed on said body for alternately supplying fluid under pressure to opposite ends of said guide cylinder for reciprocating said piston and correspondingly said wiper along said outer face of said vision block; and a second vision block disposed in end-to-end relation and at an angle to said one vision block, wherein there is provided:

a second guide member supportable on said body, disposed atop said second vision block and substantially parallel to an outer face of said one vision block;

a second follower mounted on said second guide member, displaceable along the length thereof;

a wiper carried by said second follower, having a forwardly projecting portion and a depending portion engaging the outer face of said second vision block in wiping relation therewith; and means operatively interconnecting said first mentioned and second follower for transmitting motion from said first mentioned follower to said second follower.

11. A window assembly according to claim 10 wherein said second vision block is angularly displaced relative to said one vision block at an obtuse angle.

* * * * *